US005783159A

United States Patent [19]

Aldinger

[11] Patent Number: 5,783,159
[45] Date of Patent: Jul. 21, 1998

[54] INORGANIC IMPURITIES REMOVAL IN SODA ASH SOLUTIONS WITH CARBON

[76] Inventor: Eric Aldinger, Rhône-Poulenc of Wyoming, P.O. Box 513, Green River, Wyo. 82935

[21] Appl. No.: 909,529

[22] Filed: Aug. 12, 1997

Related U.S. Application Data

[63] Continuation of Ser. No. 536,564, Sep. 29, 1995, abandoned.

[51] Int. Cl.$^6$ .................................................. C01D 7/26
[52] U.S. Cl. ..................... 423/179; 423/206.2; 423/421; 423/422
[58] Field of Search ................... 423/206.2, 421, 423/422, 179

[56] References Cited

U.S. PATENT DOCUMENTS

| | | | |
|---|---|---|---|
| 2,346,140 | 4/1944 | Pike | 423/206.2 |
| 3,528,766 | 9/1970 | Coglaiti et al. | 423/206.2 |
| 3,717,698 | 2/1973 | Ilardi | 423/206 |
| 3,869,538 | 3/1975 | Sproul | 423/206 |
| 3,927,175 | 12/1975 | Garofano et al. | 423/206.2 |
| 4,021,527 | 5/1977 | Baadsgaard | 423/206.2 |
| 4,044,097 | 8/1977 | Gancy | 423/186 |
| 4,075,281 | 2/1978 | Port et al. | 423/206.2 |
| 4,169,812 | 10/1979 | Smith et al. | 423/206.2 |
| 4,238,305 | 12/1980 | Gancy | 204/180 |
| 4,283,277 | 8/1981 | Brison | 209/166 |
| 4,299,799 | 11/1981 | Ilardi et al. | 423/206.2 |
| 4,738,836 | 4/1988 | Poncha | 423/206 |
| 5,043,149 | 8/1991 | Frint | 423/206 |
| 5,238,664 | 8/1993 | Frint | 423/206 |

*Primary Examiner*—Wayne Langel
*Attorney, Agent, or Firm*—Katherine L. Carleton

[57] ABSTRACT

The present invention relates to a method for reducing and removing inorganic impurities in sodium solutions by contact with activated carbon. Preferably, the activated carbon is saturated with organics. The process can provide for significant reduction of magnesium by as much as 50% and calcium by as much as 20%.

7 Claims, No Drawings

INORGANIC IMPURITIES REMOVAL IN SODA ASH SOLUTIONS WITH CARBON

This application is a continuation of application No. 08/536,564, filed Sep. 29, 1995, now abandoned.

This invention relates to the removal of inorganic impurities from soda ash solutions.

BACKGROUND OF THE INVENTION

In the last two decades, the classic Solvay process for the preparation of soda ash—anhydrous sodium carbonate—has been challenged successfully by the exploitation of the beds of sodium sesquicarbonate (trona) which underlie a large area in southwestern Wyoming. (A similar deposit exists in Kenya.) Substantially all the growth in soda ash capacity in the United States for this period has been in the utilization of this deposit.

Two basic processes have been used commercially in the processing of the ore, which typically contains 90 percent sodium sesquicarbonate, traces of sodium chloride, sodium sulfate and $Fe_2O_3$, several tenths of a percent of organic matter, and up to 10 percent insolubles in the form of largely silicates. One process dissolves the sesquicarbonate as such, treats the solution to remove insolubles and organic matter, and then crystallizes sodium sesquicarbonate, which may be used as such or calcined to soda ash. The resultant soda ash is pseudomorphic in form after the crystal pattern of the sodium sesquicarbonate, and special additives are needed to achieve desirable crystal properties. Moreover, the crystal structure is different from that obtained by the conventional Solvay process, so that the product is sometimes difficult to substitute for conventional Solvay process soda ash.

The second basic process for handling natural trona produces a product which is more comparable to Solvay process ash. In this process, the trona is calcined to crude soda ash; the ash is dissolved; and the solution treated to remove insolubles and organics matter. The resultant solution is crystallized to produce sodium carbonate monohydrate crystals, which are then treated to remove the water of hydration and produce soda ash.

Organics originate in the trona ore, nahcolite ore, sodium salt brines, and also from coal combustion when the latter is used to process ore. Trona organics are generally of oil-shale origin consisting of kerogenous and bitumen matter. The organics present in the crude trona must be removed, or compensated for, if satisfactory crystals, which will produce ash of acceptable physical structure, are to be obtained in the crystallization—whether monohydrate, or anhydrous soda ash, which is the product of commerce and can be produced in known fashion by the use of special crystallizing conditions. (See Seaton et al. U.S. Pat. No. 2,770,524, issued Nov. 13, 1956). If the organics are not removed, poor crystals are produced, and the product occupies too large a volume, making it uneconomical to ship and handle. Also if the organics are not reduced in concentration, the final soda ash product is not white, but an off-color which precludes its use in detergents, food-grade, and pharmaceutical end-products. Additionally, foaming occurs in the crystallizer, complicating processing. Activated carbon, both in granular and powdered forms, has been used in the natural soda ash industry to reduce the organic impurities in sodium carbonate, sodium bicarbonate, and sodium sesquicarbonate solutions Typically, the solutions are either injected with a powdered carbon slurry or pumped through a carbon bed of granular carbon. If carbon columns are used, the activated carbon is contained in vessels as granular carbon through which the sodium carbonate solution is pumped. The organics are adsorbed by the carbon resulting in a solution which will yield crystals in a desirable fashion.

The organic impurity concentrations are monitored for a decrease in organics by a color comparison or by total organic content (TOC), or other analytical methods. Once the carbon is spent, that is saturated with organics, the carbon is discarded and replaced. This method requires a substantial capital outlay for carbon treating columns, pumps and a continuous outlay for materials and labor. It would be beneficial to find a use for the spent carbon.

Surprisingly, a method for utilizing activated carbon to remove inorganic impurities such as calcium and magnesium has been discovered thus providing additional efficiency and economy of use for activated carbon treatment. Further and even more surprisingly, it has been discovered that the removal can be enhanced by utilizing spent carbon which heretofore would have been discarded or reactivated.

SUMMARY OF THE INVENTION

The present invention relates to a method for reducing and removing inorganic impurities in sodium solutions such as sodium carbonate, sodium bicarbonate and sodium sesquicarbonate solutions by contacting these solutions with activated carbon. The activated carbon may be undersaturated with organics, or totally saturated with organics which is the state where the carbon has been spent. The process of the present invention comprises contacting sodium solutions with activated carbon by passing said solutions through a carbon bed or the like.

All ratios, proportions and percentages herein are by weight, unless otherwise specified. "Comprising", as used herein, means various components can be conjointly employed. Accordingly, the terms "consisting essentially of" and "consisting of" are embodied in the term comprising.

DETAILED DESCRIPTION OF THE INVENTION

Inorganic impurities can affect the quality of the soda ash produced. "LITE™" soda ash is produced for consumers (e.g., detergent manufacturers) wanting a lighter weight soda ash, i.e., 50 instead of 60 lb/cu.ft. bulk density (BD), where 60 BD is associated with standard dense ash. One factor which controls bulk density is the calcium and magnesium content. These inorganic impurities are crystal habit modifiers which influence the shape of crystals. With reduced calcium and/or magnesium concentrations, e.g., from about 40 to about 30 ppm, light soda ash crystals are produced more readily. Production problems arise when the calcium and/or magnesium levels cannot be reduced (generally below about 40 ppm for calcium and below about 25 ppm for magnesium).

Another grade of soda ash is a high purity ash produced for customers needing a reduced content below that of standard soda ash for organics, calcium, and magnesium. Again production problems occur when the inorganic impurities are too high.

It has been discovered that activated carbon, both spent or unspent can be utilized to reduce inorganic impurities in sodium solutions including sodium carbonate, sodium bicarbonate and sodium sesquicarbonate solutions. These solutions are produced in the processing of trona and/or nahcolite ores and brines. The activated carbon may be undersaturated with organics, or saturated with organics. Being saturated with organics is known in the art as being "spent". Preferably, the carbon is spent for enhanced removal of inorganics. The organic impurities such as humic acid derivatives, are no longer comparatively removed when passed through spent carbon.

Generally, the conversion of crude trona to soda ash occurs by the conventional low-temperature calcination process in which crude trona is calcined to crude soda ash at temperatures too low to destroy or deactivate organics, about 350° C. or less. The crude soda ash is made into a saturated sodium carbonate solution containing suspended solids (insoluble gangue) and organics. Typically, an aqueous solution of from about 50 to about 250° F. is made in order to separate the sodium bearing salts from the insoluble gangue materials. The organic impurities are then reduced in concentration by activated carbon treatment. It is advantageous when utilizing carbon beds to treat with carbon after the insoluble gangue materials have been separated to avoid contaminating muds. After carbon treatment, the salt solutions are sent to crystallizers for precipitating the sodium salts and final processing into salable product. This outlined process is illustrative of a preferred process; however, any standard process or variation can be used. The novelty and invention lie in the present method for reducing inorganic impurities, i.e., calcium and magnesium ions, salts, and/or particles, utilizing the activated carbon.

The inorganic impurities, such as calcium and/or magnesium ions, salts and/or particles, are reduced in concentration by contact with activated carbon. The carbon can be in the form of granular types. With granular type carbon, the salt solutions can be passed through a carbon bed or the like. Preferably, a carbon bed is utilized. Further it is preferred to utilize spent carbon in that the calcium/magnesium removal is more dramatic (enhanced).

Generally, the method can be performed at temperatures of from about 140° to about 190° F. although higher or lower temperatures can be used. After treatment with the activated carbon, the solution can be heated to the desired crystallization temperature and fed to the crystallizer.

Carbon is filtered out of the solution and disposed. Granular carbon is regenerated with solvents and/or the organics are burned off in a furnace. In the latter case, additional carbon must be added to supplement losses.

This method for reducing the concentration of inorganic impurities has the unexpected result of substantially reducing the concentrations of inorganic impurities. Magnesium can be reduced by as much as 50% and calcium by as much as 20% or more. These reductions allow for improved crystal formation, fewer production problems, and make it possible to produce a light grade soda ash product Following is a specific embodiment of the present invention. The example is illustrative of the invention and is not intended to be limiting of it.

EXAMPLE 1

Carbon tank test:

A tank containing 2,000 Lb. of Calgon SGL 8×30 granular activated carbon was installed and a stream of saturated sodium carbonate solution was allowed to flow through the carbon bed. The flow rate was 5 to 7 GPM. The column was operated continuously for several months.

The character of the saturated solution during the test was:

sodium carbonate aqueous solution 30% by weight concentration solution specific gravity=1.29 temperature=170° to 180° F.

TOC (total organic content)=50 to 300 ppm (parts per million)

calcium content=4 to 12 ppm magnesium content=5 to 20 ppm

TOC was reduced strongly at first, abated after one month, and reached a saturation point where the inlet and outlet TOC levels were comparable.

Magnesium reduction occurred within two days and calcium reduction occurred within two weeks. Surprisingly as the carbon becomes spent, i.e., saturated with organics, the magnesium and calcium removal increased. Calcium averaged about 30% reduction and magnesium reduction was enhanced to where about 50% was being removed.

Calcium and magnesium contents were analyzed using the manufacturer's recommended atomic absorption technique for the Spectra-A machine. TOC was determined using the manufacturer's recommended technique for the Dohrmann TOC analyzer.

What is claimed is:

1. A method for reducing inorganic impurities in sodium carbonate solution comprising contacting spent carbon with a sodium carbonate solution wherein the inorganic impurities are reduced.

2. A method according to claim 1 wherein contact occurs by passing said solution through a spent carbon bed.

3. A method according to claim 2 wherein calcium ions, salts and particles; magnesium ions, salts and particles; or combination thereof are reduced.

4. A method according to claim 1 wherein said sodium carbonate is selected from the group consisting of: sodium carbonate, sodium bicarbonate, sodium sesquicarbonate, and mixtures thereof.

5. A process comprising contacting sodium carbonate solution with spent carbon by passing said solution through a spent carbon bed wherein inorganic impurities are reduced.

6. A process according to claim 5 wherein said sodium carbonate solution is selected from the group consisting of: sodium carbonate solutions, sodium bicarbonate solutions, sodium sesquicarbonate solutions, and mixtures thereof.

7. A process for removing inorganic impurities from a member of the group consisting of sodium carbonate solution, sodium bicarbonate solution, sodium sesquicarbonate solution, and mixtures thereof comprising the step of: passing said member through a bed of carbon wherein said carbon is saturated with organics and wherein inorganic impurities are removed.

* * * * *